United States Patent
Heatherly et al.

(10) Patent No.: US 8,783,512 B2
(45) Date of Patent: Jul. 22, 2014

(54) DOSING SPOUT AND SYSTEM

(76) Inventors: Richard B. Heatherly, Charleston, SC (US); Michael Morton, Johns Island, SC (US); David Nichols-Roy, Escondido, CA (US)

(*) Notice: Subject to any disclaimer, the term of this patent is extended or adjusted under 35 U.S.C. 154(b) by 90 days.

(21) Appl. No.: 13/091,788

(22) Filed: Apr. 21, 2011

(65) Prior Publication Data

US 2011/0309103 A1 Dec. 22, 2011

Related U.S. Application Data

(60) Provisional application No. 61/327,318, filed on Apr. 23, 2010.

(51) Int. Cl.
*B65D 47/32* (2006.01)

(52) U.S. Cl.
USPC .............. 222/52; 222/478; 222/484; 222/504

(58) Field of Classification Search
CPC ................................ B67C 9/00; G01F 15/005
USPC ........... 222/52, 478, 23, 28, 30, 36, 504, 484, 222/588, 506; 705/22
See application file for complete search history.

(56) References Cited

U.S. PATENT DOCUMENTS

| | | | |
|---|---|---|---|
| 1,190,586 A * | 7/1916 | Roberston | 222/481.5 |
| 1,403,636 A * | 1/1922 | Rhodes | 222/478 |
| 4,265,370 A | 5/1981 | Reilly | |
| 4,269,333 A | 5/1981 | Nakai et al. | |
| 4,651,898 A | 3/1987 | Bell | |
| 5,303,851 A | 4/1994 | Libit et al. | |
| 5,738,254 A | 4/1998 | de la Guardia | |
| 6,036,055 A * | 3/2000 | Mogadam et al. | 222/23 |
| 6,662,976 B2 * | 12/2003 | Jensen et al. | 222/481.5 |
| 6,892,166 B2 | 5/2005 | Mogadam | |
| 7,003,406 B2 * | 2/2006 | Mogadam | 702/55 |
| 7,088,258 B2 * | 8/2006 | Morrison | 340/689 |
| 7,109,863 B2 * | 9/2006 | Morrison | 340/568.1 |
| 7,260,504 B2 * | 8/2007 | Mogadam | 702/186 |
| 7,272,537 B2 * | 9/2007 | Mogadam | 702/186 |
| 7,598,883 B2 * | 10/2009 | Morrison | 340/689 |
| 7,900,799 B2 * | 3/2011 | Kuzar et al. | 222/52 |
| 2006/0027268 A1 | 2/2006 | Zapp | |
| 2007/0205203 A1 * | 9/2007 | Temko | 220/712 |
| 2007/0208541 A1 * | 9/2007 | Temko | 702/186 |
| 2007/0214055 A1 * | 9/2007 | Temko | 705/22 |
| 2008/0033666 A1 * | 2/2008 | Mogadam | 702/45 |
| 2008/0033697 A1 * | 2/2008 | Mogadam | 702/186 |
| 2008/0114488 A1 * | 5/2008 | Mogadam | 700/231 |
| 2008/0114489 A1 * | 5/2008 | Mogadam | 700/231 |
| 2008/0133150 A1 * | 6/2008 | Mogadam | 702/45 |
| 2009/0277931 A1 | 11/2009 | Zapp | |
| 2012/0211516 A1 * | 8/2012 | Zapp et al. | 222/20 |

* cited by examiner

*Primary Examiner* — Kevin P Shaver
*Assistant Examiner* — Patrick M Buechner
(74) *Attorney, Agent, or Firm* — B. Craig Killough; Barnwell Whaley Patterson Helms

(57) ABSTRACT

A dosing spout for liquid containers, and a system for inventory control, verification and accounting for liquids dispensed in smaller doses or portions from larger containers. The device controls flow of a liquid from a container in predetermined dosage size by an air tube that permits flow of liquid through a liquid tube when the container is tilted. After a predetermined time, the air tube is closed, which terminates flow of the liquid through the liquid tube. The time interval during which the air tube is open is correlated with the viscosity of the liquid in the container so that a predetermined dosage is dispensed through the dosing spout. Controls and signaling devices operate the dosing spout, and wireless communications devices and processors record uses of the dosing spout.

21 Claims, 6 Drawing Sheets

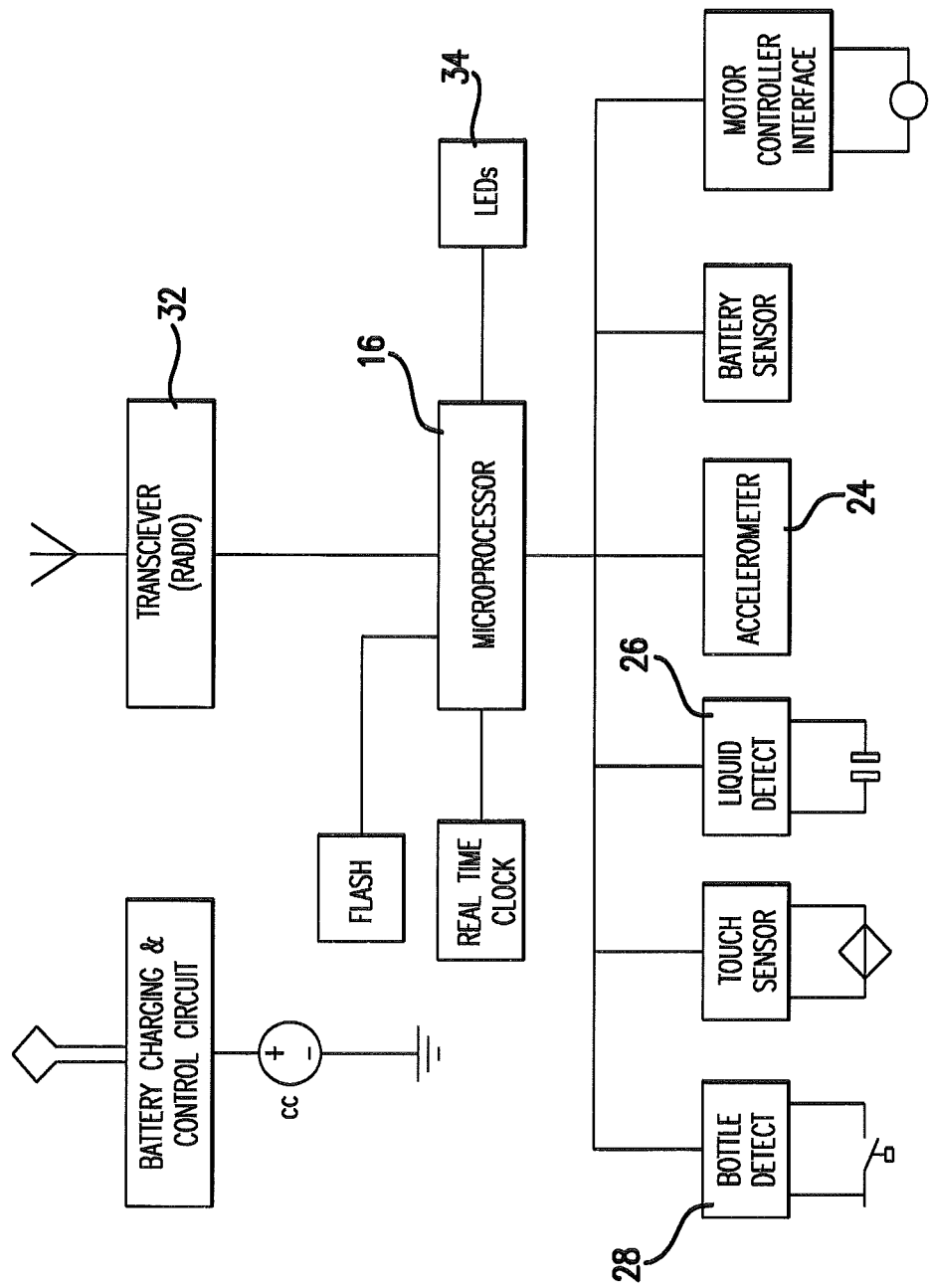

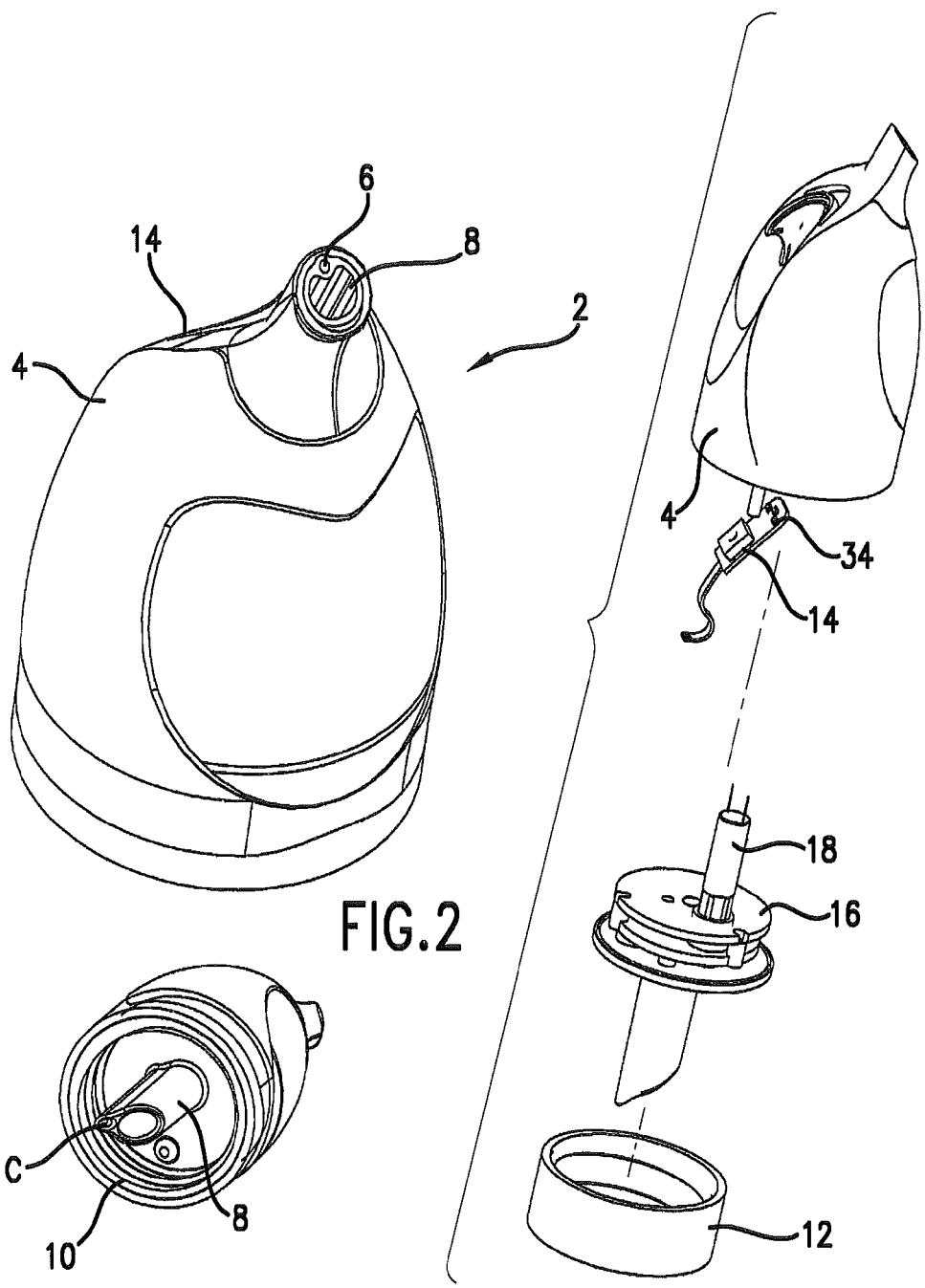
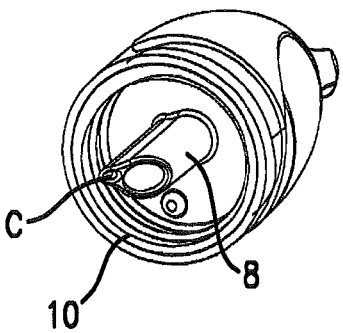
FIG.2
FIG.3
FIG.4

DOSING SPOUT AND SYSTEM

Applicant claims the benefit of Provisional Application Ser. No. 61/327,318 filed Apr. 23, 2010.

FIELD OF THE INVENTION

This invention relates to liquid dosing generally, and is more particularly directed to a spout for liquid containers that controls dosing. The invention provides a system that assists in inventory control.

BACKGROUND OF THE INVENTION

Accurate inventory control is critical to the success of businesses that sell from inventory. Sales of goods in the form of liquids create unique problems in inventory control, especially where the liquid is sold in relatively small quantities that are dispensed from a larger container. Specific examples are liquors and medicines that are dispensed in small portions or doses from containers. In the case of both liquors and medicines, the liquid may be dispensed from a bottle or similar container in relatively small quantities. However, even a small quantity of the liquid has significant value. In the case of medicines, not only is the cost of each dose a factor, but dispensary control of the drug is a required.

There is a need for a device that can be attached to existing containers that will accurately control dosages that are dispensed from containers such as bottles. The device should also report and record the number and size of the dosages dispensed. The dosing information may be compared with charges to the customer or patient to assist in preventing inventory shrinkage, or other loss of inventory due to waste, theft or misdirection of the liquid.

SUMMARY OF THE INVENTION

The present invention is a dosing spout for liquid containers, and a system for inventory control, verification and accounting for liquids dispensed in smaller doses or portions from larger containers. The device controls flow of a liquid from a container in predetermined dosage size by an air tube that permits flow of liquid through a liquid tube when the container is tilted. After a predetermined time, the air tube is closed, which terminates flow of the liquid through the liquid tube. The time interval during which the air tube is open is correlated with the viscosity of the liquid in the container so that a predetermined dosage is dispensed through the dosing spout.

The dosing spout has controls and signaling devices that indicate positioning of the dosing spout on, and its reveal from, a container, and that indicate when liquid is available to the liquid tube. Information regarding replacement of an empty container with a full container, and the number of doses and/or quantity dispensed, is transmitted from the dosing spout to a central processing unit by wireless communication.

DESCRIPTION OF THE DRAWINGS

FIG. 1A and FIG. 1B are an exemplary schematics showing elements of an embodiment of the dosing spout, and elements of the inventory monitoring and control system.

FIG. 2 shows an embodiment of a preferred embodiment of the dosing spout.

FIG. 3 shows the dosing spout of FIG. 3, emphasizing the bottom of the dosing spout, which engages a container.

FIG. 4 shows an exploded view of the dosing spout of FIG. 3.

DETAILED DESCRIPTION OF PREFERRED EMBODIMENTS

Figure 1A:
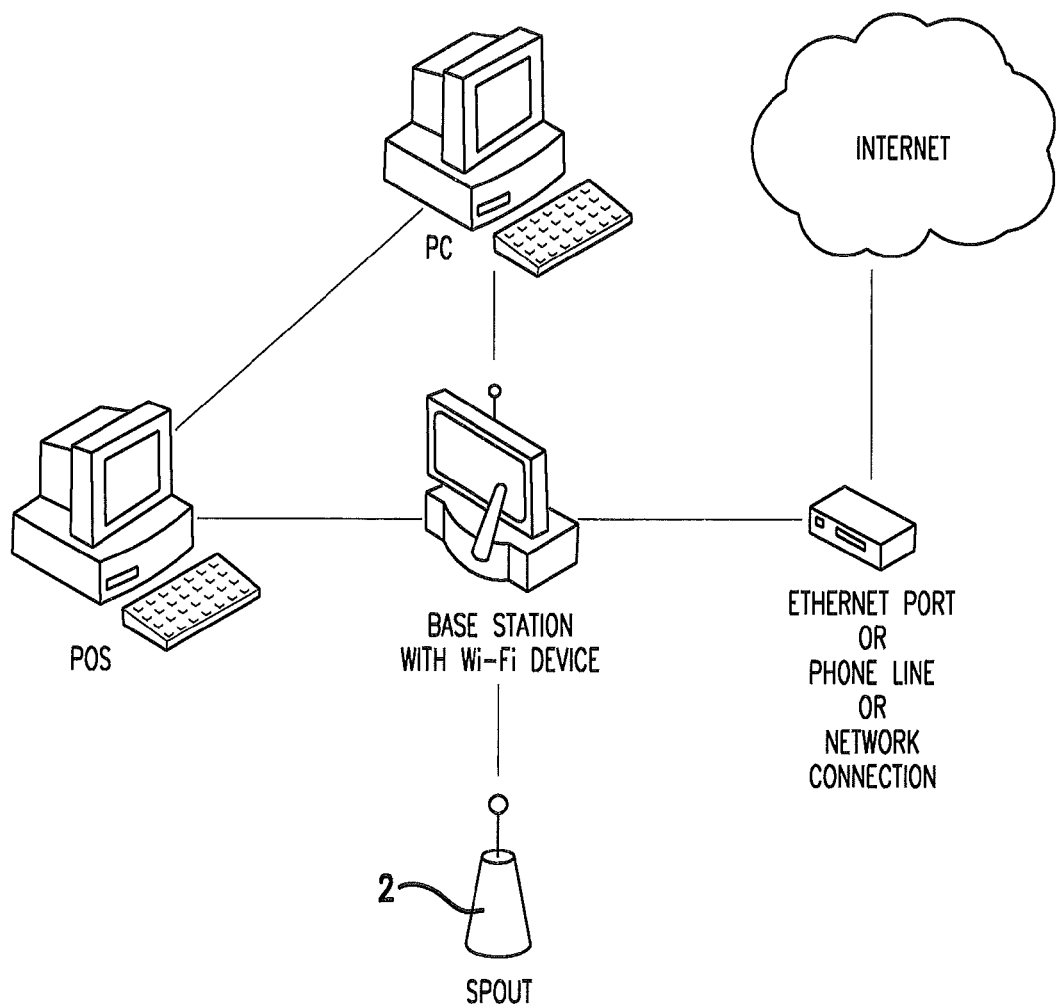

Turning now to the drawing figures, FIG. 2 shows an embodiment of the dosing spout 2. The dosing spout has a housing 4. An upper portion of the housing has an opening that permits an air inlet tube 6 to communicate with air outside of the housing, and a liquid outlet tube 8 that has an opening to an outside of the housing for dosing the liquid from the spout. As shown in FIG. 3, the air inlet tube extends through the housing to a lower portion of the housing. The liquid outlet tube also extends through the housing to a lower portion of the housing. The portion of the air inlet tube and the liquid outlet tube shown in FIG. 3 is positioned in an upper end of a container to which the dosing spout is attached.

In a preferred embodiment, the dosing spout is affixed to the container by threads 10 which match threads of a container. As shown in FIG. 4, a ring 12 with inner threads may be provided. This ring has threads that match the threads of the container to which the dosing spout is to be affixed. Accordingly, the ring should be removable from the dosing spout, so that the dosing spout may be used with containers having threads of varying sizes. The ring may be replaced with a ring having threads of the specification required for the particular container.

The dosing spout is used with liquid containers of the type that are in common use. The most common container used with the dosing spout is a bottle having a neck of reduced size, with an opening in the upper end of the neck when the bottle is positioned vertically and resting on its bottom. Most containers will have external threads formed in the container neck. The container may be glass, PET or other plastics or other materials from which containers are made. Most commonly, the containers will range from 100 ml to 3 liters in size, but could be larger or smaller.

In another embodiment, the spout is retained within the container by an interference fitting, using fitting that is similar to a cork. A "cork" as used in the liquor industry is typically a plastic stopper that may be tapered for entry into the container, and typically has a plurality of annular rings that provide resistance from pulling out.

As shown in FIG. 4, a portion control switch 14 is present in the housing. The portion control switch communicates with a microprocessor 16 that may be part of the internal control mechanism. In one embodiment, the portion control switch presents LEDs 34 that are color coded. Portion selection is performed according to color code. For example, one LED may be red, one green and one blue. The operator may select the portion to be dispensed that correlates with each color. One color may correspond to one (1) ounce of liquid, another color corresponds to one-and-one-half (1½) ounces of liquid, while a third color corresponds to two (2) ounces of liquid. Additional colors and dosages may be included in the devices as required by the application.

The internal mechanism is present in the body. The internal mechanism includes a motor 18, a pinch valve 20 and associated actuator, and the micro-processor 16.

Figure 5:
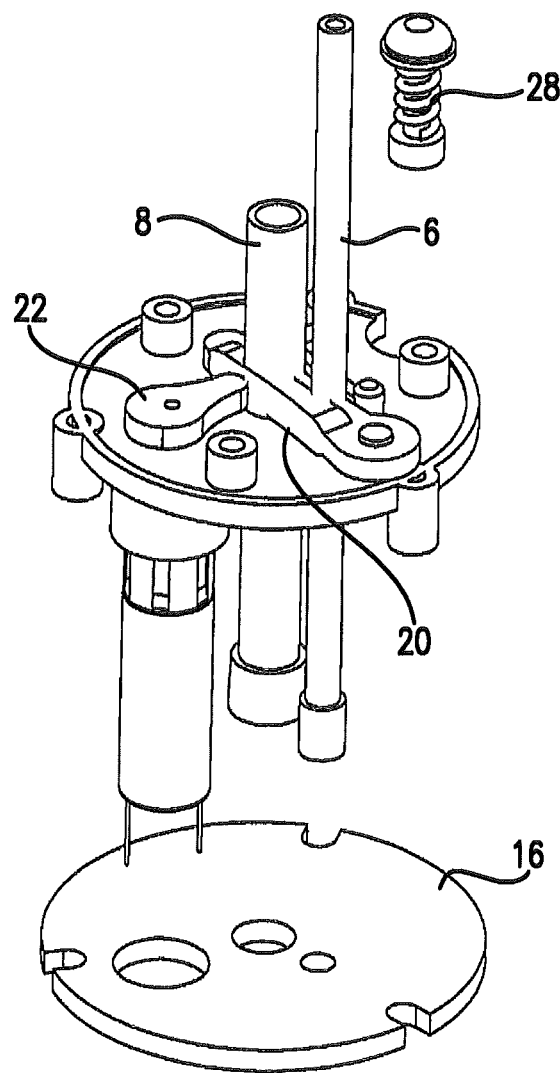
FIG. 5 shows the internal mechanical mechanism of a preferred embodiment of the dosing spout.

FIG. 5 shows the internal mechanism according to a preferred embodiment. The internal mechanism as shown comprises a motor, a pinch valve, and a cam 22 that is rotated by the motor to operate the pinch valve. In this embodiment, the pinch valve is forced by the cam against the air tube and the liquid tube, to pinch and close a lumen that is present in each of the air inlet tube and the liquid outlet tube. The air inlet tube and liquid outlet tube are formed of a resilient material which allows each of them to be closed by pinching the tubes to restrict air flow and liquid flow, respectively, through the lumens of the tubes. The tubes are preferred to be formed of a resilient material that has shape memory characteristics. The resilient material allows the tubes to be pinched shut, yet the tubes fully open after numerous cycles of opening and closing. In particular, tubes comprising food grade silicone are capable of rapidly opening when pressure from the pinch valve is withdrawn, and a tube comprising silicone may have sufficient shape memory to return to the fully open position even after the opening and closing cycle is repeated numerous times.

FIG. 5 shows the pinch tube holding the air inlet tube and the liquid outlet tube in the normal position, which is the closed position. When the container is in a generally vertical position, that is, when the longitudinal axis of the container is in a generally vertical position, the cam holds the pinch valve in position against the air inlet tube and the liquid outlet tube, so that the air inlet tube and liquid outlet tube are pinched to a closed position.

In this embodiment, portion or dosing control is achieved by opening and closing the air inlet tube. Spring biasing forces the pinch valve away from the air inlet tube as pressure from the cam is released.

Figure 6:
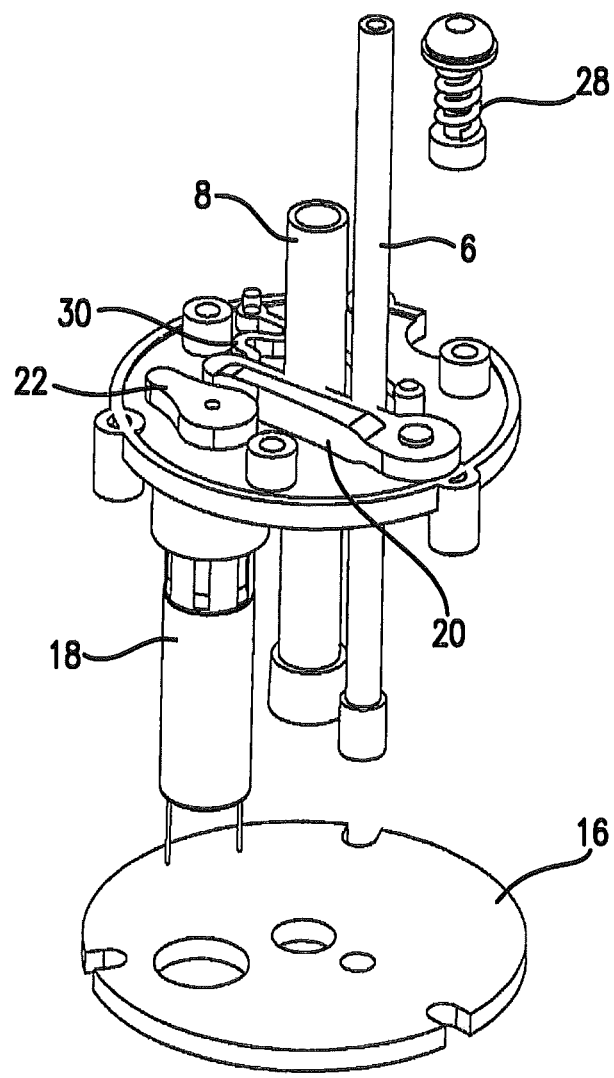
FIG. 6 shows an additional view of the internal mechanism of the dosing spout.

In a preferred embodiment, the pinch valve is attached to the liquid outlet tube. By attaching the pinch value to the liquid outlet tube, opening of the liquid outlet tube is assured, as the retreating pinch valve pulls the liquid outlet tube with it. FIG. 6. If liquids having a sticky consistency are dispensed through the dosing spout, the pinch valve, by spring biasing action, will insure that the liquid outlet tube opens fully to dispense the proper dosage.

In a preferred embodiment, the motor rotates the cam to force the pinch valve against the air inlet tube. The air inlet tube is in the normally closed position. The pinch valve is constructed and arranged so that, as the pinch valve is moved by the cam to the normally closed position, the air inlet tube is closed slightly before the liquid outlet tube is closed. This operation is believed to enhance accurate portion control by the device. Dosing and portion control results from opening and closing the air inlet tube. However, particularly as the liquid level decreases in the bottle, the quantity of air in the container increases. In some containers, and with some liquids, as the quantity of air increases, there is an increased tendency for the liquid to drip after the air inlet tube is closed. Accordingly, in a preferred embodiment, the liquid outlet tube is closed by the pinch valve to inhibit dripping.

As the container is tilted to a position which allows liquid to flow into the liquid dispensing tube, an angle detection device 24, or accelerometer, or inclinometer, notes a change in the position of the container from a vertical position to an angle that, in a preferred embodiment, approaches a horizontal position. The angle detection device sends a signal, preferably through the microprocessor, for the motor to rotate the cam to the position shown in FIG. 6, thereby opening the air inlet tube, and in some embodiments, the liquid outlet tube, subject to liquid being available to the liquid outlet tube. A liquid detection device 26 detects the presence or absence of liquid available to the liquid outlet tube. If the angle detection device detects an appropriate angle, and there is liquid available to the liquid outlet tube, a switch is closed which causes the motor to rotate the cam to the position shown in FIG. 6. The spring 30 pushes the pinch valve to open the lumen in the air inlet tube, and in some embodiments, the liquid outlet tube, and liquid flows through the liquid outlet tube and out of the spout. The angle at which the neck of the container, and subsequently the liquid tube, will receive and fill with liquid depends on the quantity of liquid remaining in the container. In one embodiment, the angle detection device signals to actuate the motor when the container is inverted, and the opening of the container reaches 30° to 45° below horizontal.

In a preferred embodiment, the angle detection device will signal to actuate the motor when the container opening reaches an inverted position. An inverted position means that the axis of the opening of the container (which, for most containers, is generally coaxial with the longitudinal axis of the container) is below horizontal. In use, the container is usually stored in a vertical position with the axis of the opening, and usually, the longitudinal axis of the container, in a vertical position. The operator picks up the container and tilts it to, and through, a horizontal axis of the opening, until the opening is below horizontal. At most fill levels, liquid is introduced and is available to the liquid tube, and the angle detection device and liquid detection device signal to actuate the motor, opening the air inlet tube and the liquid outlet tube as described herein to dispense the liquid. If the liquid level is so low that further tilting of the bottle toward an inverted position is necessary, the process of opening the tubes is not initiated until the liquid detection device detects that liquid is available to be dispensed.

After a predetermined period of time, the motor rotates the cam to push the pinch valve back into the normally closed position of FIG. 5 terminating the flow of air through the air inlet tube, which in turn terminates the flow of liquid through the liquid outlet tube, since there is no air pressure available to permit a flow of liquid from the liquid outlet tube. The time that the pinch valve is in the position shown in FIG. 6, permitting the flow of air into the container, and liquid out of the container, is chosen according to the required dosage or quantity of liquid to be dispensed. This predetermined time will be varied by the selection on the portion control switch, with a larger portion or dosage corresponding to a longer time interval during which the pinch valve is in the position of FIG. 6. However, dosage is a also a function of the viscosity of the liquid, and the predetermined time that the air inlet tube is open is also determined and programmed according to known viscosities of particular liquids. For example, vodka has a lower viscosity than certain liqueurs, particularly milk-based liqueurs. However, these viscosities are known, and can be programmed to the dosing spout as required.

Figure 7:
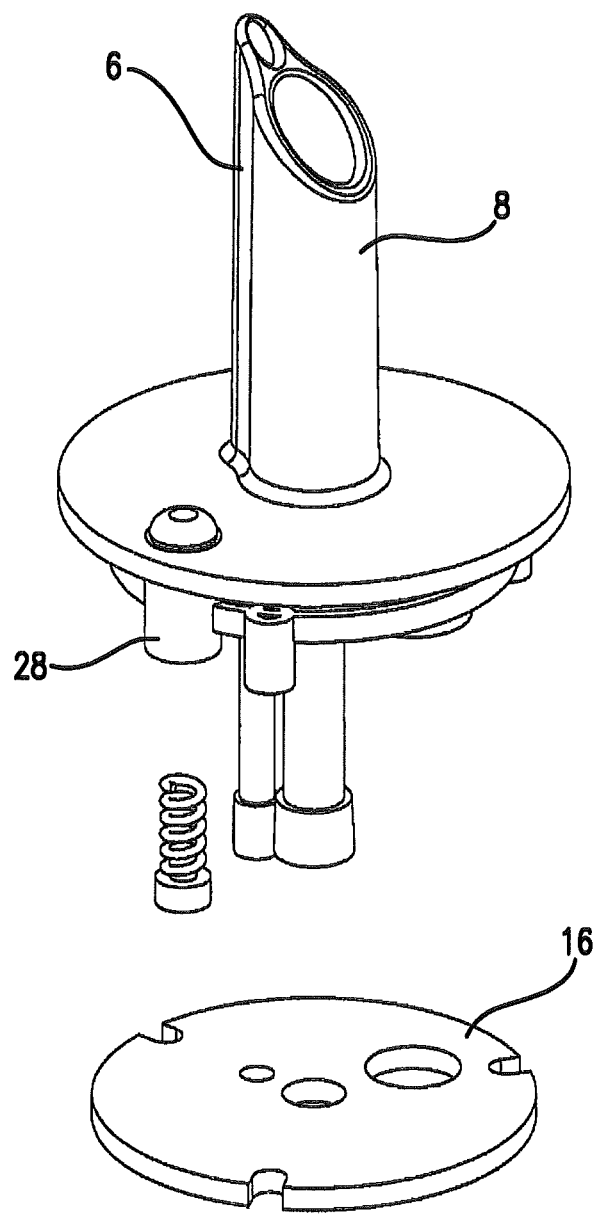
FIG. 7 shows an additional view of the internal mechanism of the dosing spout.

In a preferred embodiment, the device comprises a bottle or container detect actuator. FIG. 7. The container detect actuator may be a switch 28. In this embodiment, unless the container detect actuator switch is closed, the device cannot be operated. The container detect actuator may be a pressure switch that is closed by pushing a button on the bottom of the actuator upward, which will occur as the device is threaded onto the container. The wireless signal incorporated into the device sends a signal to the central processor indicating that the dosing spout is affixed to the container, while also signaling when the dosing spout is removed from the container. This signal may be actuated by the container detect actuator, which is preferred to communicate with the microprocessor. An alert may be sent if the overall quantity dispensed through the dosing spout does not correspond to the original quantity of liquid in the container. For example, if the spout is removed from the container before all of the liquid is dispensed, a signal is sent to the central processing unit. This prohibits the operator from removing the dosing spout to pour liquid from the container, and bypassing communication of dosing information.

In some instances the operator will wish to dispense multiple doses without returning the container to the vertical position. In one embodiment, after the cam is actuated to return to the normally closed position after a predetermined time to terminate liquid flow, the cam rotates by operation of the motor, and the spring forces the pinch valve to open the air inlet. The spout resumes dosing. The pinch valve, after predetermined time and associated dosage, returns to the normally closed position. This cycle can be repeated multiple times according to one embodiment, as long as the angle detection device does not detect that the container has been returned to a more vertical position, and as long as liquid is available for the liquid outlet tube. By way of example, if an operator wishes to dispense three consecutive doses of a beverage into three glasses, the operator can tilt the bottle. The angle detection device and liquid detection device will send a signal to actuate the motor, moving the cam and allowing the pinch valve to open the air inlet tube and liquid outlet tube for the predetermined time. After the first dose is dispensed, the pinch valve, by actuation of the motor and cam, will briefly close the air inlet tube and liquid outlet tube, then reopen for a second dose. This cycle is repeated for a third dose, and will occur as long as the container is held in a position that will actuate the angle detection device and the liquid detection device.

In a preferred embodiment, the dosing spout comprises a microprocessor and a wireless transmitter 32. The microprocessor may be contained in the device as shown in the drawing figures. The wireless transceiver communicates with a central processing unit or system. As shown in FIG. 1A, a wireless receiving device communicates with one or more processors, which may be personal computers, or which may be other larger remote computers that are available for connection, such as connection via the Internet. The system may receive wireless signals from multiple dosing spouts, and record events such as pour events as received from each of the dosing spouts.

It is preferred that that device have a default to a preferred predetermined pour (air tube open) time. For example, if the operator's last selection is three (3) ounces, the device will default to one (1) ounce after the container is returned to the vertical position.

A preferred embodiment has a "Last Pour Memory". If a requested portion is not completed; the dosing spout will cause this event to be stored in memory and will complete the pour from the next bottle. Last Pour Memory has a programmable "time out" feature of, for example, 1 to 10 minutes.

The device may detect a partial pour will be detected. Partial pour is an act of either giving a "splash" or under pouring. A programmable percentage "splash" level, below which the pour will be ignored, may be incorporated. A default level for the splash may be as programmed such as about 10% of current selected shot size.

A programmable percentage "under pour" level, at or above which the pour will be considered a full shot, may be incorporated. For example, about 90% of current selected shot size may be considered a full pour. Any shot size measured in the range above the "splash" and below the "under pour" generates an alert signal.

The dosing sprout may use wireless connectivity to a base station. The base station may detect if the spout is out of range. The dosing spout may store pour events that have not been successfully transmitted to a wireless access point, such as a base station or processor, and communicates those events when the communications link is reestablished. The base station may have personal computer or smart phone access for system configuration and report printing. Web based reports may be used. It is preferred that all pour events and reports are time stamped to provide security, control, and accountability.

The spout is preferred to be a battery powered device. Remaining battery life estimates may be sent to the base station or processor. The spout may have a battery life indicator as reported by the LED interface. The battery or batteries that power the spout may be rechargeable, and the spout may be placed in a charger configured to accept the spout without removal of the batteries.

For each pour event, and for each cosing spout in the system, it is preferred that a message will be sent to or logged by the base station or processor. Data sent or recorded for each pour event may include:
 pour time—the time of day, in seconds, minutes, and hour.
 the volume of each pour and an aggregate volume, such as the aggregate volume for the current container, or for a period of time.
 selected liquid type or class.
 operator identifier.
 location identifier.
 container size, which many include a default size.
 if free pour is available, the volume of the pour.
 monetary value for pour event, and for an aggregate of pour events.

Pricing options may be provided according to time of day, such as periods of special pricing. A calendar may be programmed for special events or holidays. Unique or special pricing may be applied to pour events within those defined times or dates.

When the container is tilted into the pour position and the liquid detect device detects a lack of liquid, an "empty container" status may be sent to the base station or processor. Further, information may include the last pour time, status of last pour (such as, was the last poor completed before the container was changed, or remains to be completed), liquid type or class, operator identification, and location of the spout. The device may also compute the number of shots poured from the container.

A cleaning event alert may also be communicated to the spout, and logged by the processor. The spout, when in the cleaning mode, places the pinch valve in the open position. The cleaning mode may activate, and may remain activated, when the spout is disengaged from the container. The cleaning mode may deactivate when the spout is reengaged with a container. In one embodiment, when the spout is disengaged from a containers and a portion selection button is depressed and held for a predetermined time, the cleaning mode is activated. The cleaning mode is deactivated when the container detect actuator senses that the spout is engaged with a container. If the spout is removed from a partial container for cleaning, then reengaged, when the portion selection button is depressed and held for a predetermined time, the spout will resume its count of the partial container as of the count when the spout was removed.

Container movement during defined times, such as business closed hours, is detected and logged. The times for detecting container movement are user selectable and may be wirelessly communicated to some or all spouts.

When a new container is installed, the spout momentarily (for example, ½ second) opens the valve to relieve pressure resulting from inserting the spout into the container. A residue release is used for the dispensing of thick or creamy products.

When residue release is selected, the spout is open momentarily (for example, ½ second) after returning to the upright or vertical position to allow residue to return to the container.

The spout is preferred to have an automatic shutoff and a "sleep" mode. If the spout is not used to dispense liquid in within a predetermined time, the spout will shutoff or go into sleep mode. The time interval for shutoff may be user selectable. If the spout is removed from the container, the removal is wireless reported by the system and the event is recorded. The automatic shutoff is time actuated, with the actuation time selected by the user. The automatic shutoff may actuate, for example, at closing time of a restaurant, so that no more liquid may be dispensed after closing time. The shutoff allows pouring to resume at another preset time, such as when the restaurant opens.

What is claimed:

1. A dosing spout for a container, comprising:
an air inlet tube comprising a lumen therein;
a liquid outlet tube comprising a lumen therein;
a dosage control, the dosage control comprising a pinch valve constructed and arranged to first contact the air inlet tube and apply closing force to the air inlet tube to close the lumen of the air inlet tube and control liquid dosing through the liquid outlet tube by inhibiting air flow through the air inlet tube, wherein the pinch valve is constructed and arranged to subsequently contact the liquid outlet tube and apply closing force to the liquid outlet tube to close the lumen of the liquid outlet tube, and the pinch valve is constructed and arranged to relieve closing force on the air inlet tube and the liquid outlet tube to open the lumen of the air inlet tube and to open the lumen of the liquid outlet tube to allow flow of liquid through the liquid outlet tube.

2. A dosing spout for a container as described in claim 1, the dosing spout further comprising an angle detection device, wherein the angle detection device actuates the pinch valve to move away from the air inlet tube to relieve closing force on the air inlet tube and to open the air inlet tube to allow flow of liquid through the liquid outlet tube in response to a position of the angle detection device.

3. A dosing spout for a container as described in claim 1, the dosing spout further comprising an angle detection device, wherein the angle detection device actuates the pinch valve to move away from the air inlet tube to relieve closing force on the air inlet tube and to open the air inlet tube to allow flow of liquid through the liquid outlet tube in response to the angle detection device sensing that an opening of the container is in a substantially inverted position.

4. A dosing spout for a container as described in claim 1, the dosing spout further comprising an angle detection device, wherein the angle detection device actuates the pinch valve to apply closing force to the air inlet tube to hold the air inlet tube in a normally closed position, and the pinch valve is actuated to relieve closing force on the air inlet tube to open the air inlet tube to allow flow of liquid through the liquid outlet tube in response to the angle detection device sensing that an opening of the container is in a substantially inverted position.

5. A dosing spout for a container as described in claim 1, the dosing spout further comprising an angle detection device, wherein the angle detection device actuates a motor in response to a signal from the angle detection device to relieve closing force on the air inlet tube to open the air inlet tube to allow flow of liquid through the liquid outlet tube.

6. A dosing spout for a container as described in claim 1, the dosing spout further comprising an angle detection device, wherein the angle detection device actuates a motor to relieve closing force on the air inlet tube to open the air inlet tube to allow flow of liquid through the liquid outlet tube in response to a signal generated by the angle sensing device upon the angle sensing device sensing that an opening of the container is in a substantially inverted position.

7. A dosing spout for a container as described in claim 1, the dosing spout further comprising an angle detection device, wherein the pinch valve applies closing force to the air inlet tube to hold the air inlet tube in a normally closed position, and the pinch valve is actuated to relieve closing force on the air inlet tube to open the air inlet tube to allow the flow of liquid through the liquid outlet tube in response to a signal generated by the angle sensing device, upon the angle sensing device sensing that an opening of the container is in a substantially inverted position.

8. A dosing spout for a container as described in claim 1, wherein the pinch valve is constructed and arranged to variably apply closing force to close a lumen of the liquid outlet tube and to relieve closing force on the liquid outlet tube.

9. A dosing spout for a container as described in claim 1, the dosing spout further comprising an angle detection device, wherein the pinch valve is actuated to relieve closing force on the air inlet tube to open the air inlet tube to allow the flow of liquid through the liquid outlet tube in response to a position of the angle detection device, and wherein the air inlet tube is opened for a predetermined time interval to allow the flow of liquid through the liquid outlet tube.

10. A dosing spout for a container as described in claim 1, the dosing spout further comprising an angle detection device, wherein the pinch valve is actuated to relieve closing force on the air inlet tube to open the air inlet tube to allow the flow of liquid through the liquid outlet tube in response to a position of the angle detection device, and wherein the air inlet tube is opened for a predetermined time interval to allow the flow of liquid through the liquid outlet tube, and wherein the predetermined time interval is a function of a viscosity of a liquid in the container and a desired dosage of liquid passing through the dosing spout.

11. A dosing spout for a container as described in claim 1, the dosing spout further comprising an angle detection device, wherein the pinch valve applies closing force to the air inlet tube to hold the air inlet tube in a normally closed position, and the pinch valve is actuated to relieve closing force on the air inlet tube to open the air inlet tube for a predetermined time interval to allow the flow of liquid through the liquid outlet tube in response to a position of the angle detection device sensing that an opening of the container is in a substantially inverted position, and upon expiration of the predetermined time interval, the pinch valve is actuated to apply closing force to close the lumen of the air inlet tube to inhibit flow of liquid through the liquid outlet tube, whereupon, when the opening of the container remains in a substantially inverted position for a second predetermined time interval, the pinch valve is actuated to relieve closing force on the air inlet tube to open the air inlet tube for the predetermined time interval and to again allow the flow of liquid through the liquid outlet tube.

12. A dosing spout for a container as described in claim 1, the dosing spout further comprising a liquid detection device that communicates with the liquid outlet tube, wherein the liquid detection device prohibits actuation of the pinch valve to open the air inlet tube if no liquid is present in the liquid outlet tube.

13. A dosing spout for a container as described in claim 1, the dosing spout further comprising an angle detection device, wherein the angle detection device actuates the pinch valve to relieve closing force on the air inlet tube to open the air inlet tube to allow the flow of liquid through the liquid outlet tube in response to a signal from the angle detection device, the dosing spout further comprising a liquid detection device that communicates with the liquid outlet tube, wherein the liquid detection device prohibits actuation of the pinch valve to open the air inlet tube in response to a signal from the angle detection device if no liquid is present in the liquid outlet tube.

14. A dosing spout for a container as described in claim 1, wherein the pinch valve comprises an arm that is attached to the liquid outlet tube.

15. A dosing spout for a container as described in claim 1, wherein the dosing spout comprises threads that are constructed and arranged to engage threads of the container to which the dosing spout is connected.

16. A dosing spout for a container as described in claim 1, the dosing spout further comprising a container detect actuator, wherein the container detect actuator is in communication with an actuator for the pinch valve.

17. A dosing spout for a container as described in claim 1, the dosing spout further comprising a container detect actuator, wherein the container detect actuator is in communication with an actuator for the pinch valve, and wherein the container detect actuator is a closing force switch that is closed by engagement with the container.

18. A dosing spout for a container as described in claim 1, the dosing spout further comprising a container detect actuator, wherein the container detect actuator is in communication with an actuator for the pinch valve and wherein the dosing spout comprises threads that are constructed and arranged to engage threads of the container to which the dosing spout is connected, and wherein engagement of the dosing spout threads with the container thread closes the container detect actuator and holds the container detect actuator in a closed position.

19. A dosing spout for a container as described in claim 1, the dosing spout further comprising an angle detection device, wherein the pinch valve is actuated to relieve closing force on the air inlet tube to open the air inlet tube to allow the flow of liquid through the liquid outlet tube in response to a position of the angle detection device, and wherein the air inlet tube is opened for a predetermined time interval, and further comprising a selector switch that communicates with a processor that communicates with an actuator for the pinch valve to change the predetermined time interval that the air inlet tube is open to allow the flow of liquid through the liquid outlet tube.

20. A dosing spout for a container as described in claim 1, the dosing spout further comprising an angle detection device, wherein angle detection device actuates the pinch valve to relieve closing force on the air inlet tube to open the air inlet tube to allow the flow of liquid through the liquid outlet tube in response to a position of the angle detection device, and wherein the air inlet tube is opened for a predetermined time interval, and wherein the predetermined time interval is a function of a viscosity of a liquid in the container and a desired dosage of liquid passing through the dosing spout the dosing spout further comprising a selector switch that communicates with a processor that communicates with an actuator for the pinch valve to change the predetermined time interval that the air inlet tube is open to allow the flow of liquid through the liquid outlet tube.

21. A dosing spout for a container as described in claim 1, the dosing spout further comprising a wireless transmitter that transmits the status of the dosing spout to a central processor.

* * * * *